2,829,083
Patented Apr. 1, 1958

2,829,083

ISOTHIOCYANOETHYLIMIDAZOLIDINETHIONE

Chien-Pen Lo, Philadelphia, Pa., assignor to Rohm & Haas Company, Philadelphia, Pa., a corporation of Delaware No Drawing. Application May 25, 1956
Serial No. 587,222

10 Claims. (Cl. 167—33)

This invention concerns 1-β-isothiocyanoethyl-2-imidazolidinethione, a method for its preparation, its application to or about plants to protect them against fungus diseases, and fungicidal compositions containing this compound.

This compound is an unusual isothiocyanate in that it is a stable solid which is free from the pungent odor and the lachrymatory properties which are generally associated with common isothiocyanates. This compound has other unusual properties. An outstanding one is its extreme toxicity to many types of fungi which cause plant diseases without evident phytotoxicity.

This new compound can be prepared by acting on a soluble salt of β-[1-(2-thionoimidazolidyl)]ethyldithiocarbamic acid with an ester of chloroformic acid and heating the resulting reaction mixture or letting it stand with evolution of gas. Alternatively, a soluble salt of β-[1-(2-thionoimidazolidyl)]ethyldithiocarbamic acid is reacted at low temperature with an alkyl chloroformate or other ester of chloroformic acid in which the alcohol group contains not over about four carbons, whereby an alkoxycarbonyl-β-[1-(2-thionoimidazolidyl)]ethyldithiocarbamate is formed as an intermediate, but this is decomposed either by heating or on standing in the presence of a liquid such as water, an organic liquid, or a mixture thereof.

In the first stage of the preparation the reaction is advantageously effected between a soluble salt of β-[1-(2-thionoimidazolidyl)]ethyldithiocarbamic acid and an ester of chloroformic acid and an alcohol preferably of a molecular weight not over about 81 at a temperature below about 35° C., usually between —10° and about 30° C. These materials are conveniently brought together in solution, water, lower alkanols, lower ketones, or other water-miscible solvent, or other inert organic solvent, or mixtures of solvents being useful for the purposes of this invention. Often when organic solvents are used, the first reaction product can be precipitated by addition of water. The precipitate may be left in the liquid or it may be separated.

In either case the first reaction product is decomposed either by heating or upon standing. The reaction product is maintained in the presence of a liquid until evolution of gas ceases.

The mixture of first reaction product and liquid may be heated between 50° and 125° C. to accelerate the decompositional changes to the desired isothiocyanate. The reaction tends to be slower at lower temperatures, but nevertheless occurs. The desired isothiocyanate separates from the reaction mixture in the form of an oil or a solid. It may be used as obtained or it may be washed and/or recrystallized.

When the first reaction mixture or product is merely allowed to stand, it may be kept at 20° to 50° C. for a period of 10 to 100 hours or more, depending in large part upon the choice of alcohol residue in the chloroformate and upon conditions of reaction. The isopropyl chloroformate and β-chloroethyl chloroformate give initial reaction products which readily decompose even in the cold on mere standing. With other chloroformates it is usually best to heat the mixture somewhat. The chief step here is to maintain the reaction mixture in the presence of some liquid until evolution of gas ceases, usually between 20° and 125° C.

Typical preparations are described in the following examples which are given by way of illustration and not by way of limitation. Parts are by weight unless otherwise designated.

Example 1

A solution of 38.5 parts of sodium β-[1-(2-thionoimidazolidyl)]ethyldithiocarbamate trihydrate (see U. S. Patent 2,577,700) was made in 50 parts of water. This solution was slowly added with stirring to a chilled solution of 13 parts of ethyl chloroformate in 80 parts of ethanol. The reaction mixture was kept between 0° and 10° C. with the aid of an ice bath. When mixing was complete, the mixture was stirred for two hours, whereupon 100 parts of water was added. A solid separated and was collected on a filter, where it was washed with water and then with ethanol. It was dried in the air. This product, amounting to 26 parts, was identified as ethyoxycarbonyl-β-[1-(2-thionoimidazolidyl)]-ethyldithiocarbamate. It melted at 74°–75° C. By analysis it contained 14.1% of nitrogen and 32.5% of sulfur (theory 14.4% and 32.8% respectively).

There were mixed 10 parts of this product and 50 parts of water. The mixture was heated on a steam bath, decomposition taking place with evolution of gas. Heating was continued for two hours. The solid present in the heated mixture was filtered off, washed with water, and dried in air. There was obtained six parts by weight of a substance identified as 1-β-isothiocyanoethyl-2-imidazolidinethione, which melted at 132.5–134° C. as obtained. It was recrystallized from a mixture of acetone and water and then melted at 133°–134° C. It contained by analysis 22.0% of nitrogen and 34.2% of sulfur (22.0% and 34.2% respectively by theory).

Example 2

In the same general way there were mixed 34 parts of potassium β-[1-(2-thionoimidazolidyl]ethyldithiocarbamate with 50 parts of ethanol and 35 parts of water. This solution was slowly added to a chilled solution of 13 parts of ethyl chloroformate and 80 parts of ethanol with stirring and cooling to maintain the reaction mixture below 10° C. The resulting mixture was stirred for about two hours. Addition was then made of 100 parts of water and the mixture was well stirred. The solid which was present was filtered off, washed with water and ethanol, and air dried. It melted at 74°–75° C. and corresponded in composition to ethyoxycarbonyl-β-[1-(2-thionoimidazolidyl)]ethyldithiocarbamate.

A 10 part portion of this was heated as in Example 1. The product was identified as 1-β-isothiocyanoethyl-2-imidazolidinethione, having the correct analysis therefor and melting at 131°–134° C.

Repetition of the above procedure with use of other alkanols, such as methanol, propanol, or tert-butanol, or with acetone, methyl ethyl ketone, alone or in combination with water leads to the identical end product. In place of ethyl chloroformate there may be used other chloroformate esters, such as methyl, isopropyl, propyl, butyl, or methoxyethyl, or chloroethyl, or hydroxyethyl, or the like with the same end result. The reaction need not be carried out step-wise but may be carried out at room temperature with standing for several days, the 1-β-isothiocyanoethyl-2-imidazolidinethione forming as a solid.

Example 3

There were mixed 39.5 parts of sodium β-[1-(2-thionoimidazolidyl)]ethyldithiocarbamate trihydrate, 19.5 parts of isopropyl chloroformate, and 200 parts of acetone at 25°–30° C. The mixture was stirred at room temperature for 18 hours. About 200 parts of water was then added. An oil separated and was taken up in chloroform. The chloroform layer was taken off and evaporated to give a solid residue. This was recrystallized from isopropanol and melted at 130°–132° C. The yield was 22 parts of 1-β-isothiocyanoethyl-2-imidazolidinethione.

Example 4

The procedure of the previous example was followed, starting with 60 parts of sodium β-[1-(2-thionoimidazolidyl)]-1-ethyldithiocarbamate trihydrate and 30 parts of n-butyl chloroformate in acetone. The mixture was stirred overnight (16 hours) at room temperature and then treated with 300 parts of water for an hour. An oil separated and was taken up in chloroform as above and the solid product recovered. It melted at 130°–132° C. and amounted to 20 parts of 1-β-isothiocyanoethyl-2-imidazolidinethione.

Example 5

A mixture of 48.6 parts of sodium β-[1-(2-thionoimidazolidyl)]ethyldithiocarbamate trihydrate, 28.6 parts of 2-chloroethyl chloroformate, and 200 parts of acetone was stirred at about 20°–25° C. for 16 hours. The sodium chloride which had formed as a solid was filtered off. The filtrate was concentrated under reduced pressure to give a solid residue. This was recrystallized from chloroform to give 27 parts of 1-β-isothiocyanoethyl-2-imidazolidinethione, melting at 132°–134° C.

The above examples are sufficient to show procedures by which the novel 1-β-isothiocyanoethyl-2-imidazolidinethione can be readily prepared. There are obvious variations in solvent, concentration, temperature, and time which can be made without changing the nature of the end product.

This product gives reactions which are typical of isothiocyanates. For example, it reacts with aniline to give N-phenyl-N'-β-[1-(2-thionoimidazolidyl)]ethylthiourea, melting point 181°–183° C., which gives the correct analysis for this compound. It reacts with dimethylamine to give N,N-dimethyl-N'-β-[1-(2-thionoimidazolidyl)]ethylthiourea, melting point 154°–156° C.

There has also been prepared in this research work 1-β-isothiocyanoethyl-2-imidazolidinone by reacting an alkyl chloroformate, such as isopropyl chloroformate (40 parts), with sodium β-[1-(2-ketoimidazolidyl)]ethyldithiocarbamate (71 parts) in water or acetone (200 parts) at low temperature, followed by treating the resulting solid in ethanol and water on a steam bath for two hours. When the solution is concentrated, an orange oil is obtained which is 1-β-isothiocyanoethyl-2-imidazolidinone. Fungitoxicity tests with it show but moderate activity, $LD_{50}$ values against typical test fungi being found of around 1000 p. p. m. Evidently, not all isothiocyanates are effective fungicides.

In contrast with this oxygen analogue the 1-β-isothiocyanoethyl-2-imidazolidinethione gives $LD_{50}$ values of 5 p. p. m. or less against standard organisms. For example, in the standard fungitoxicity tests where slides are treated at successive dilutions of compound and spores are incubated thereon, an $LD_{50}$ value of 5 p. p. m. was found with Stemphylium sarcinaeforme and a value of less than 5 p. p. m. with Monilinia fructicola.

In tests with bean plants it was found that 1-β-isothiocyanoethyl-2-imidazolidinethione was an excellent protective agent against rust. Plants which had been sprayed with a dispersion of this compound at a dilution of one part per 1000 did not develop rust when an aqueous suspension of spores of Uromyces appendiculatus was applied thereto (25,000 urediniospores per ml.) and the inoculated plants were incubated at 20° C. for 16–18 hours in an illuminated chamber at 100% relative humidity followed by storage for 12 days in a greenhouse. Readings were then made and compared with untreated control plants. Repetition at one part in 1666 likewise showed excellent protection.

In tests for evaluation against late blight on tomatoes a culture of Phytophthera infestans was raised on lima bean agar. At about 10 days spores were scraped off into distilled water and the resulting suspension adjusted to 30,000 sporangia/ml. Young tomato plants of the Rutgers variety were sprayed with suspensions of 1-β-isothiocyanoethyl-2-imidazolidinethione at various concentrations and allowed to dry. They were then inoculated with about eight ml. of the spore suspension per plant, incubated at 12° C. for 18 hours, and placed in a greenhouse. Readings were made after seven days. This compound gave at least a 97% control of late blight at one-half pound per hundred gallons of spray.

One way of applying the compound of this invention is to dissolve it in acetone and extend a concentrated acetone solution with water to give a suspension at a proper concentration.

Another form for convenient application is as an emulsifiable concentrate. Thus 5 parts of the compound, 90 parts of an aromatic naphtha or xylene, and five parts of a solvent-soluble emulsifying composition (for example, two parts of the water-soluble condensate of ethylene oxide and methylene bis-(diamylphenol) and three parts of calcium dodecylbenzenesulfonate) are mixed and extended with water as required for a spray.

A wettable powder may be prepared by mixing together 25 parts of 1-β-isothiocyanoethyl-2-imidazolidinethione, 70 parts of finely particled clay or clays or mixtures of other finely divided inert solids, two parts of a lignin sulfonate, and three parts of a just dry preparation of octylphenoxypolyethoxyethanol on magnesium carbonate. This powder is suspended in water and sprayed. It has an advantage of preventing undue accumulations of the active compound at any one site.

The wettable powder may also be extended with inert finely divided solid or solids to give dusts at 1% to 10% of active agent. If desired, dusts may be prepared directly by mixing the compound and inert solid extenders.

The compound of this invention, 1-β-isothiocyanoethyl-2-imidazolidinethione, may be used as the sole pesticidal agent or as one of several agents, including other fungicides, which might be desired to protect against specific plant disease, or miticide, insecticide, or other agent.

The rather unique behavior of 1-β-isothiocyanoethyl-2-imidazolidinethione apparently depends upon the presence of sulfur on the heterocyclic ring and the hydrogen on the nitrogen of the ring as well as the particular type of structure of this compound. This compound may be depicted in the conventional style as

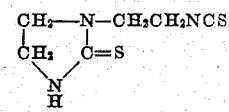

Its unusual stability and lack of the usual offensive properties associated with most isothiocyanates may be due to hydrogen bonding, the molecule than taking the form

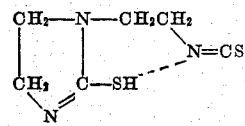

In this form it could still undergo characteristic reactions with aniline and dimethylamine to give thioureas. It is thus useful as an intermediate for providing substituted thioureas, thiourethanes, and like compounds containing the above ring structure.

I claim:
1. The compound 1-β-isothiocyanoethyl-2-imidazolidinethione.
2. A process for preparing 1-β-isothiocyanoethyl-2-imidazolidinethione which comprises reacting a soluble salt of β-[1-(2-thionoimidazolidyl)]ethyldithiocarbamic acid with an ester of chloroformic acid and an alcohol from the class consisting of alkanols of not over four carbon atoms, methoxyethanol, chloroethanol, and hydroxyethanol to form a reaction product and decomposing the said reaction product.
3. A process for preparing 1-β-isothiocyanoethyl-2-imidazolidinethione which comprises reacting between about −10° and 30° C. a soluble salt of β-[1-(2-thionoimidazolidyl)]ethyldithiocarbamic acid and a lower alkyl ester of chloroformic acid, whereby a reaction product is formed, and heating said reaction product in the presence of a liquid from the class consisting of water and inert organic solvents between 50° and 125° C. with evolution of gas.
4. A process for preparing 1-β-isothiocyanoethyl-2-imidazolidinethione which comprises reacting below about 35° C. sodium β-[1-(2-thionoimidazolidyl)]ethyldithiocarbamate and an ester of an alcohol from the class consisting of alkanols of not over four carbon atoms, methoxyethanol, chloroethanol, and hydroxyethanol and chloroformic acid and maintaining the resulting reaction mixture in the presence of a liquid from the class consisting of water and inert organic solvents until evolution of gas ceases.
5. A process for preparing 1-β-isothiocyanoethyl-2-imidazolidinethione which comprises reacting below about 35° C. sodium β-[1-(2-thionoimidazolidyl)]ethyldithiocarbamate and β-chloroethyl chloroformate and maintaining the resulting reaction mixture between 20° and 125° C. in the presence of a liquid from the class consisting of water and inert organic solvents until evolution of gas ceases.
6. A process for preparing 1-β-isothiocyanoethyl-2-imidazolidinethione which comprises reacting below about 35° C. sodium β-[1-(2-thionoimidazolidyl)]ethyldithiocarbamate and isopropyl chloroformate.
7. As a fungicidal composition, a mixture of 1-β-isothiocyanoethyl-2-imidazolidinethione and a carrier therefor.
8. As a fungicidal composition, a mixture of 1-β-isothiocyanoethyl-2-imidazolidinethione dispersed with a finely divided solid carrier.
9. As a fungicidal composition, an emulsifiable solution of 1-β-isothiocyanoethyl-2-imidazolidinethione dissolved in an inert organic solvent therefor together with a minor proportion of a solvent-soluble dispersing agent.
10. A process for controlling fungal diseases of plants which comprises applying thereto 1-β-isothiocyanoethyl-2-imidazolidinethione.

References Cited in the file of this patent
UNITED STATES PATENTS

| | | |
|---|---|---|
| 2,577,700 | Croxall et al. | Dec. 4, 1951 |
| 2,613,211 | Hurwitz et al. | Oct. 7, 1952 |